United States Patent
Koc (10) Patent No.: US 8,090,934 B2
(45) Date of Patent: Jan. 3, 2012

(54) SYSTEMS AND METHODS FOR PROVIDING SECURITY FOR COMPUTER SYSTEMS

(76) Inventor: Cetin Kaya Koc, Istanbul (TR)

( * ) Notice: Subject to any disclaimer, the term of this patent is extended or adjusted under 35 U.S.C. 154(b) by 1150 days.

(21) Appl. No.: 11/774,951

(22) Filed: Jul. 9, 2007

(65) Prior Publication Data

US 2008/0052499 A1 Feb. 28, 2008

Related U.S. Application Data

(60) Provisional application No. 60/843,448, filed on Sep. 7, 2006, provisional application No. 60/830,210, filed on Jul. 11, 2006.

(51) Int. Cl.
*G06F 7/38* (2006.01)
(52) U.S. Cl. .......................................... 712/238; 726/26
(58) Field of Classification Search .................. 712/238, 712/239, 233, 237, 241; 708/250; 726/34, 726/22, 26, 30
See application file for complete search history.

(56) References Cited

U.S. PATENT DOCUMENTS

| | | | | |
|---|---|---|---|---|
| 5,623,615 A * | 4/1997 | Salem et al. | | 712/238 |
| 5,842,008 A * | 11/1998 | Gochman et al. | | 712/240 |
| 6,529,905 B1 * | 3/2003 | Bray et al. | | 1/1 |
| 7,143,401 B2 * | 11/2006 | Babaian et al. | | 717/149 |
| 2001/0032305 A1 * | 10/2001 | Barry | | 712/34 |
| 2007/0113059 A1 * | 5/2007 | Tran | | 712/241 |
| 2007/0226795 A1 * | 9/2007 | Conti et al. | | 726/22 |
| 2009/0217017 A1 * | 8/2009 | Alexander et al. | | 712/241 |

* cited by examiner

*Primary Examiner* — Beemnet Dada
(74) *Attorney, Agent, or Firm* — Kilpatrick Townsend & Stockton LLP; Gerald T. Gray; Ben Holt (57) ABSTRACT

Hardware and/or software countermeasures are provided to reduce or eliminate vulnerabilities due to the observable and/or predictable states and state transitions of microprocessor components such as instruction cache, data cache, branch prediction unit(s), branch target buffer(s) and other components. For example, for branch prediction units, various hardware and/or software countermeasures are provided to reduce vulnerabilities in the branch prediction unit (BPU) and to protect against the security vulnerabilities due the observable and/or predictable states and state transitions during BPU operations.

6 Claims, 8 Drawing Sheets

SYSTEMS AND METHODS FOR PROVIDING SECURITY FOR COMPUTER SYSTEMS

CROSS-REFERENCES TO RELATED APPLICATIONS

This application claims the benefit of U.S. Provisional Application Ser. No. 60/830,210, filed Jul. 11, 2006, and U.S. Provisional Application Ser. No. 60/843,448, filed Sep. 7, 2006, the disclosures of which are each incorporated herein by reference in its entirety.

BACKGROUND

The present invention relates in general to computing systems and more particularly to systems and methods for providing security for computing systems having a processing unit, such as a microprocessor, with one or more processor components such as cache units, instruction cache units, branch prediction units, branch target buffers, and other components.

Over the years, various techniques have been developed for protecting computing systems from unauthorized access. For example, techniques for protecting computing systems can be software and/or hardware based. Many of today's techniques are software based and target network intruders. Unfortunately, many conventional techniques today do not effectively protect computing systems from various types of security breaches. For example, the central processing units (CPUs) have recently been shown to cause unforeseen security vulnerabilities that threaten the entire computing system.

More recently, there have been increased research efforts concentrating on the security analysis of computing systems by analyzing the vulnerabilities due to the functional behavior of microprocessor components such as branch prediction units. As described above, computing systems are often vulnerable to security breaches at the processor level. More specifically, it is well-known that microprocessor components such as instruction cache and branch prediction units create significant security weaknesses.

Figure 1:
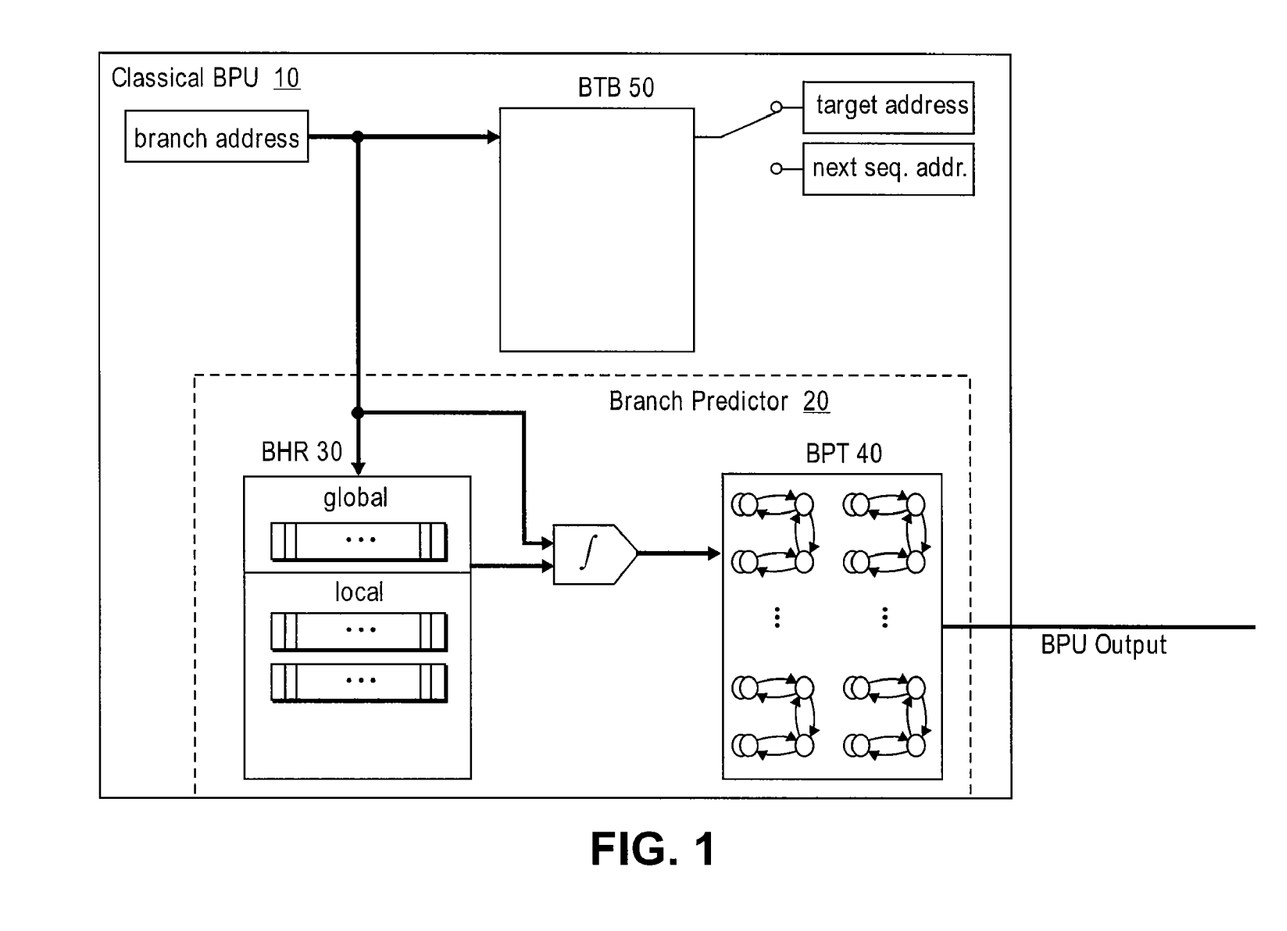
FIG. 1 shows a conventional Branch Prediction Unit that includes a branch predictor and a branch target buffer (BTB).

Branch prediction is an important aspect of modern computing and is used in virtually all computing systems. Typically, a branch prediction unit (BPU) is an integral part of the central processing unit (CPU) and its functions include determining whether a conditional branch in the instruction flow of a program or process is likely to be taken or not. As shown in FIG. 1, a conventional BPU 10 typically includes a branch predictor 20 and a branch target buffer (BTB) 50. The BPU 10 uses both the BTB 50 and branch predictor 20 to assist the CPU in performing speculative execution, e.g., by deciding the most likely execution path after a conditional branch.

In conventional computer architectures, the predictor 20 is a part of the BPU that makes the prediction on the outcome of the branch. The predictor usually is a unit that predicts the most likely execution path after a conditional branch by trying to find repetitive patterns in the history of the conditional branch. For example, there are different parts of a predictor 20, including, but not limited to, branch history registers (BHR) 30 such as global history registers and local history registers, and branch prediction tables 40.

In various computer architectures, the BTB 50 is the buffer where the CPU stores the target addresses of the previously executed branches. Because this buffer is limited in size, the CPU can only store a limited number of such target addresses. For example, a previously stored address may be replaced by a new address if the new address needs to be stored. Typically, a buffer is implemented by an array of registers, each register location holding the logical value of 1 or 0. If the CPU cannot find the target address of a branch in the BTB, it has to compute the address. Typically, the computation process imposes a performance cost, as the CPU cannot immediately feed the pipeline with instructions from the correct path.

As an important component of the CPU, the state of the BPU affects the execution of a process in a CPU. Often, an attacker is able to predict the state transitions during the execution of a process, as these transitions cause observable effects. For example, typically the execution time of a process, the power consumption of the processor (thus the power consumption of the entire system), the electromagnetic dissipation of the processor (thus the entire system), etc. depend on the state of microprocessor components such as the BPU, data cache, instruction cache and the like. The execution time also depends on the transitions of these states. Furthermore, typical microprocessors use special registers that keep track of these changes and store statistics related to these states transitions. Such registers can also be used to observe these states and state transitions. The ways to observe such information are not limited to these specific examples, and additional ways are known to those skilled in the art. The knowledge of these states and state transition gives an attacker the ability to predict the secret and/or hidden values used in a security mechanism or process. For example, it is possible to determine a secret value by checking whether a Montgomery multiplication executes the extra reduction during an RSA exponentiation.

As another example, an attacker may alter the state of the BPU, instruction cache and/or other components of a processor to cause measurable effects on the execution of a cipher process, which is, generally, an algorithm for performing encryption and decryption. These effects, especially those on the encryption time, can be directly or indirectly observed by an attacker and can be used to compromise the computer system and/or its security functions. In addition, the execution of the cipher process also affects the state transitions. For example, the cipher leaves its footprints when the instruction cache and BPU state changes depending on the execution. An attacker may examine these states to capture these footprints and obtain the secret values if the execution flow is key-dependent. In other words, an adversary can learn the execution flow of a cipher using BPU and/or instruction cache based attacks. If this execution flow depends on a key, for example, the attacker may be able to obtain the key and break into the computer system. The security vulnerabilities caused by the observable state and state transitions due to the functionalities of the processor components are not limited to the examples given herein.

Accordingly, it is desirable to provide improved security solutions for computing systems. In particular, it is desirable to provide better security solutions for protecting computing systems from attacks that exploit the state of the processor and system components and to protect against the security vulnerabilities due to the BPU operations.

BRIEF SUMMARY

The present invention provides improved security systems and methods for use in computing systems, such as computer systems, embedded systems, smart-card based systems and any other microprocessor-based systems that perform computations, especially security related and/or security critical computations. According to certain embodiments, systems and methods are provided for preventing attacks that depend on the state of the microprocessor and/or microprocessor components or other computing system components including, but not limited to, branch prediction units, instruction caches, data caches and the like, and the transitions between these states.

According to certain embodiments of the present invention, hardware and/or software countermeasures are provided to reduce or eliminate vulnerabilities due to the observable and/or predictable states and state transitions of microprocessor components such as instruction cache, data cache, branch prediction unit(s), branch target buffer(s) and other components. For example, in a specific embodiment related to branch prediction units, various hardware and/or software countermeasures are provided to reduce vulnerabilities in the branch prediction unit (BPU) and to protect against the security vulnerabilities due the observable and/or predictable states and state transitions during BPU operations. For example, certain aspects of the present invention help reduce the risk of the BTB being attacked, and certain aspects help make the branch predictor more secure. In the past, various threats against computing systems have exploited predictor and/or BTB behavior to obtain sensitive information processed by a CPU. It is therefore to be appreciated that the present invention provides various embodiments for preventing such threats. It is also to be understood that the present invention has a wide range of applications and is not limited to branch prediction related security measures.

According to one aspect of the present invention, a computing system is provided that typically includes a processing unit having a component that provides an output signal, and a signal modification unit that receives the output signal. The signal modification unit is typically configured to output one of the output signal or a fake output signal responsive to a received control signal. In certain aspects, the component includes a branch prediction unit (BPU) that provides a BPU output signal. In certain aspects, the system further includes a random number generator that provides a random value signal, wherein the signal modification unit generates the fake output signal using the random value signal responsive to the control signal indicating that a fake output signal be output. In certain aspects, the signal modification unit includes a circuit element configured to produce the fake output signal by randomly inverting the received output signal. In certain aspects, the signal modification unit includes a multiplex circuit element configured to produce the fake output signal by multiplexing the received output signal and one or more bits of the random value signal. In certain aspects, the computing system is implemented in one of a desktop computer system, a laptop computer system, a mainframe computer system, a cell phone device, or a personal digital assistant device.

According to another aspect of the present invention, a computing system is provided that typically includes one or more logical and/or physical processing units each for executing one or more processes, and a buffer module, wherein one or more of the processing units and/or processes executing in a processing unit is allocated an independent, unshared buffer space in the buffer module. In certain aspects, the buffer module includes a plurality of separate physical buffer units, wherein each process is allocated one or more separate physical buffer units. In certain aspects, the buffer module includes a single physical buffer space, wherein each process is allocated a separate physical portion of the buffer space. In certain aspects, the buffer module includes a plurality of separate physical buffer units, and wherein each process is allocated a separate buffer space that spans one or more buffer units. In certain aspects, each independent, unshared buffer space is allocated to each process virtually and/or dynamically. In certain aspects, the buffer unit is one of a cache, an instruction cache or a branch target buffer. In certain aspects, the computing system is implemented in one of a desktop computer system, a laptop computer system, a mainframe computer system, a cell phone device, or a personal digital assistant device.

According to another aspect of the present invention, a computing system is provided that typically includes a processing unit that executes one or more processes, and a branch target buffer (BTB), wherein the BTB includes a plurality of entries, each entry having an associated lock bit. In operation, a process executing on the processing unit determines whether to set a lock bit for a BTB entry, and BTB entries having a set lock bit are handled differently than BTB entries that do not have a set lock bit. In certain aspects, entries having a set lock bit cannot be evicted by a process other than the process that set the lock bit or an operating system. In certain aspects, the operating system evicts entries having a lock bit set by a first process after the first process has terminated. In certain aspects, the associated lock bit is stored in a memory location different from the BTB. In certain aspects, the associated lock bit is stored with the entry in the BTB. In certain aspects, the computing system is implemented in one of a desktop computer system, a laptop computer system, a mainframe computer system, a cell phone device, or a personal digital assistant device.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Embodiments of the present invention provide security systems and methods for computing systems having one or more processing components, such as a microprocessors, each with one or more processor components such as cache units, instruction cache units, branch prediction units, branch target buffers, and other components. In one specific embodiment, for example, the present invention provides methods and systems for preventing security breaches related to branch prediction by central processing units. Merely by way of example, the invention is described as it applies to architectural level security of computing systems, but it should be recognized that the invention has a broader range of applicability. Embodiments of the present invention are useful in a variety of computing systems and device incorporating computing systems. Examples include desktop computer systems, laptop computer systems, mainframe computer systems, cell phone devices, personal digital assistant devices, smart cards, embedded systems, etc. and any other systems incorporating a microprocessor or similar intelligence module.

Also, although the remainder of this document will discuss embodiments and aspects of the invention in terms of their applicability to BPU and BTB units, it should be appreciated that embodiments and aspects of the present invention may be applied to any other processor components. Examples of such components include data cache and instruction cache. In general, a processor component is a component having an internal state that is affected by execution of a process, which produce state transitions in the component. In many cases, these states and state transitions may be observable by an adversary using appropriate measurement techniques. A processor component typically includes a collection of one or more circuit elements that are configured to perform one or more specific tasks. Additionally, it should be appreciated that, where an output signal is mentioned, embodiments of the present invention are equally applicable to any signal in a processor component, e.g., any signal on a wire internal to a component or any signal between components.

Predictor Related Countermeasures

According to various embodiments, system security is improved by making it difficult for an adversary to observe the output of a processor component using methods described herein. In certain aspects, new secure instructions are used, and the implementers need to use them to indicate for which conditional branches need to be handled securely. According to one aspect, in these new secure branch instructions, at least one bit, which indicates whether the branch needs to be handled securely, is different than in the original branch instruction.

In certain embodiments, the predictor for certain user-determined conditional branches is disabled. In a specific embodiment, the predictor is disabled so that branch prediction operations are not performed. In another embodiment, the predictor functions normally but the outcome of the prediction is ignored. For example, the execution has to stall until the actual outcome of the branch is determined. To achieve this functionality, the control logic of the predictor is modified.

These embodiments can also be adapted to the cases of other microprocessor components such as data cache, instruction cache, and the like. For example, data cache and/or instruction cache can be disabled for certain user-determined memory accesses. In some embodiments, data cache and/or instruction cache may be disabled so that memory accesses are not served from these components. In some embodiments, certain user-determined memory accesses may not be served from these components. In other embodiments, these microprocessor components may function normally but the outcomes may be ignored and certain user-determined memory accesses may not served from these components.

For example, in one embodiment, randomization functionality is added to the behavior of the predictor. Conventional predictor functionalities are usually implemented as a function of the state of the predictor (i.e., local and global branch history, BTB state and the individual predictors), and the address of the conditional branch. The state transition is usually also a function of the above items plus the actual outcome of the branch:
  prediction=f(current state, branch address),
  next state=g(current state, branch address, branch target address, prediction, actual outcome).

These functions can be generalized for other processor components such as data cache, instruction cache, and the like:
  the output of the component=f(current state of the component, other related data),
  the next state of the component=g(current state of the component, other related data),
for some functions f and g. Here the data denoted as "other related data" in these functions may in some cases include the output of these components.

Figure 2:
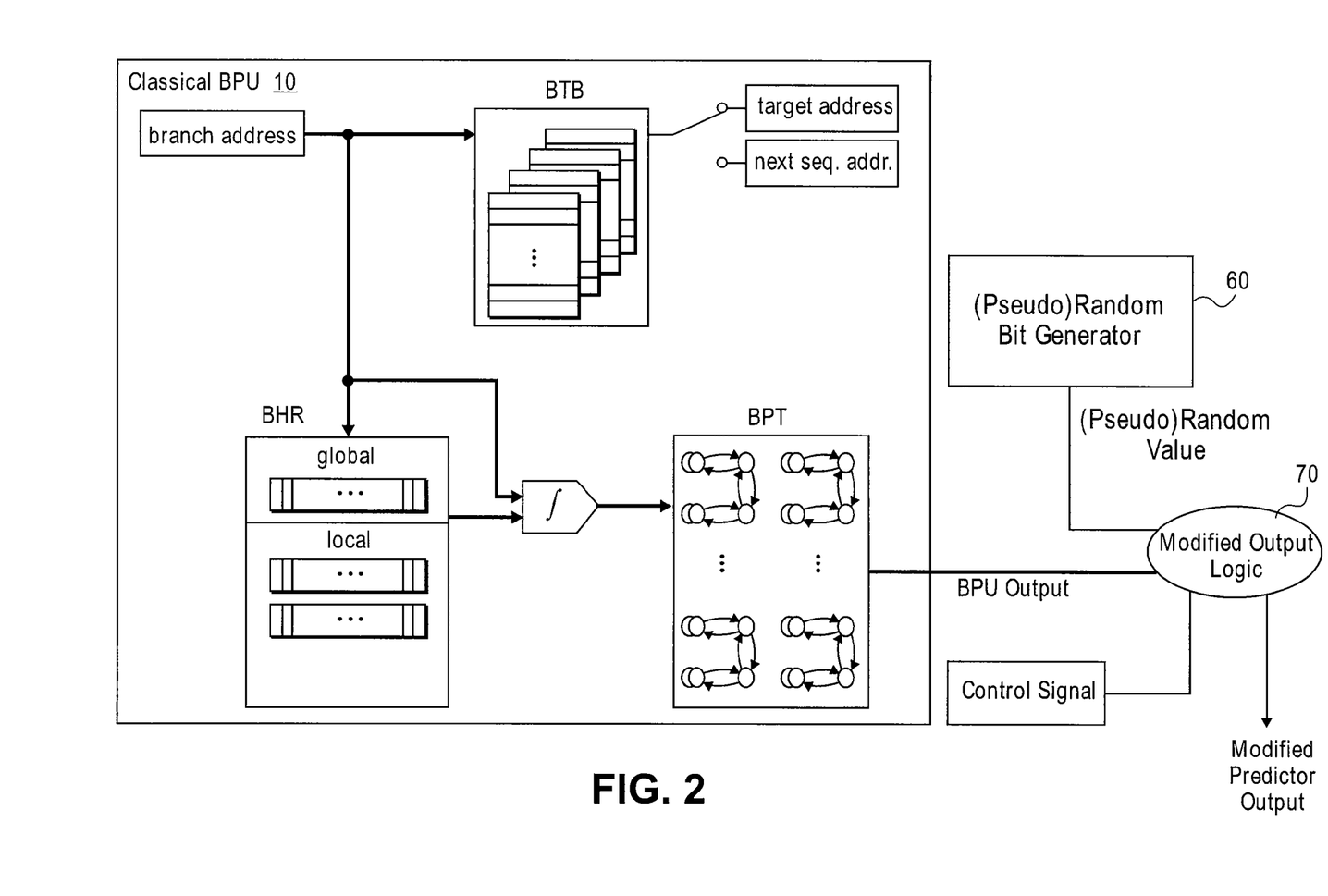
FIG. 2 is an illustration of how to add randomizations to the behavior of a predictor according to one embodiment of the present invention.

In one embodiment, an element is added to the above functions, which element makes it difficult for an adversary to predict or observe the state or state transition. For example, in one aspect, a pseudorandom element is added to the above state functions. One example is a pseudo random number generator (PRNG) 60, as shown in FIG. 2. PRNG 60 may already be present in the chipset or it may be added. The PRNG 60 provides a (random) output signal to a signal modification logic circuit 70. A particular bit of the values (one or more bits) generated by the PRNG 60 can be used by the logic circuit 70, or a function of more than one bit may be chosen. A control signal specifies whether the logic circuit 70 will output the randomized (i.e., fake) prediction or the actual outcome of the traditional predictor. For example, in one aspect, the random prediction outcomes are desired to be 50% Taken and 50% Not Taken. However, it should be appreciated that other ratios of Taken to Not Taken may be used.

In other aspects, any signal may be used to add randomness or unpredictability to the output of the predictor. For example, In one aspect, the function of PRNG 60 (to provide a signal to logic circuit 70) in FIG. 2 may be implemented by a signal generator that outputs a constant signal; logic circuit 70, responsive to the control signal, will output the fake signal based on the constant signal or it will output the actual prediction signal. In another aspect, the function of PRNG 60 may also be implemented by a clock signal, either an external clock signal, or a clock signal internal to logic circuit 70. In general, the signal provided to logic circuit 70 may be implemented by a variety of signal generator elements known to those skilled in the art.

Figure 3:
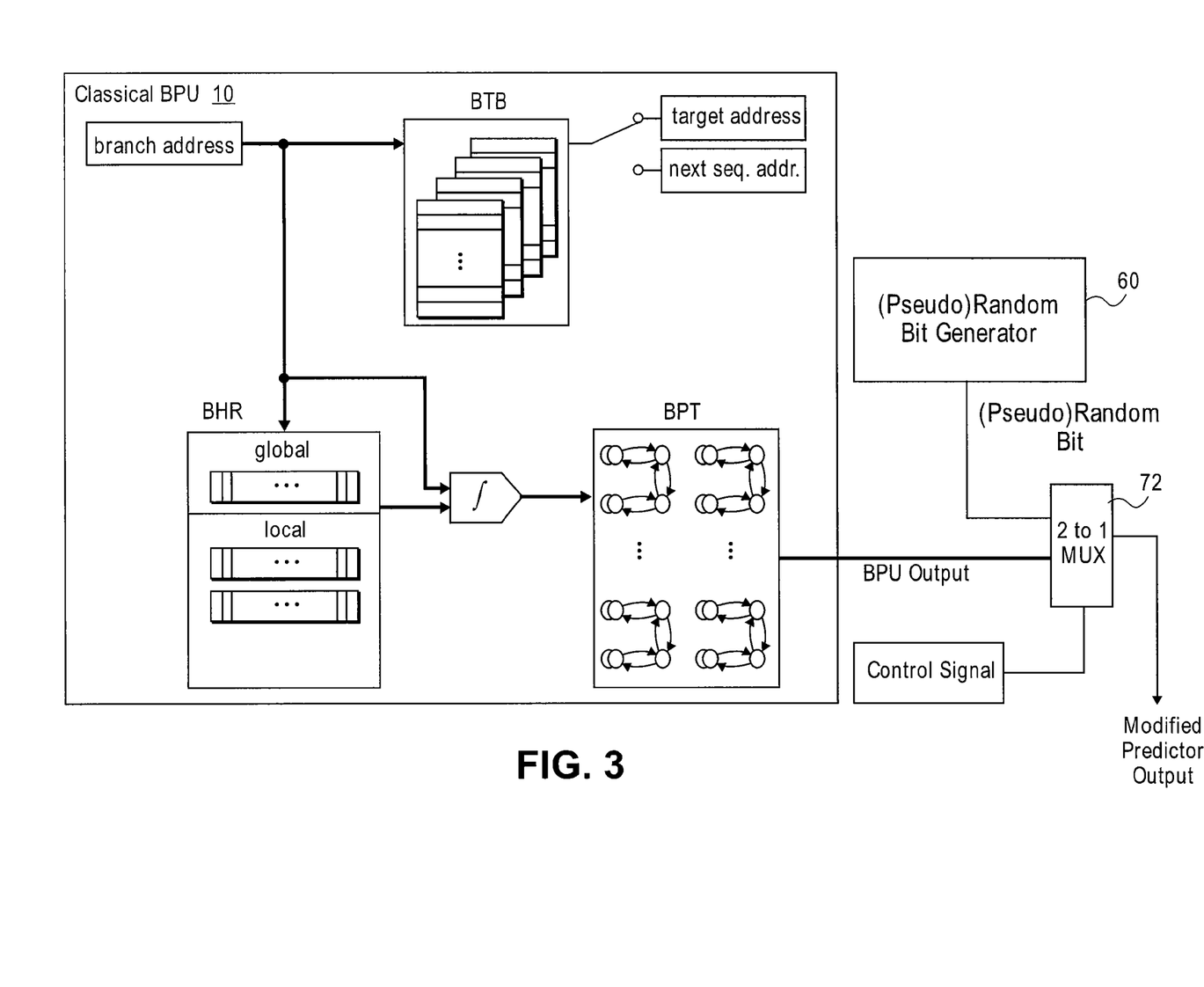
FIG. 3 illustrates logic circuitry for selecting the classical or random prediction outcome according to an embodiment of the present invention.
Figure 4:
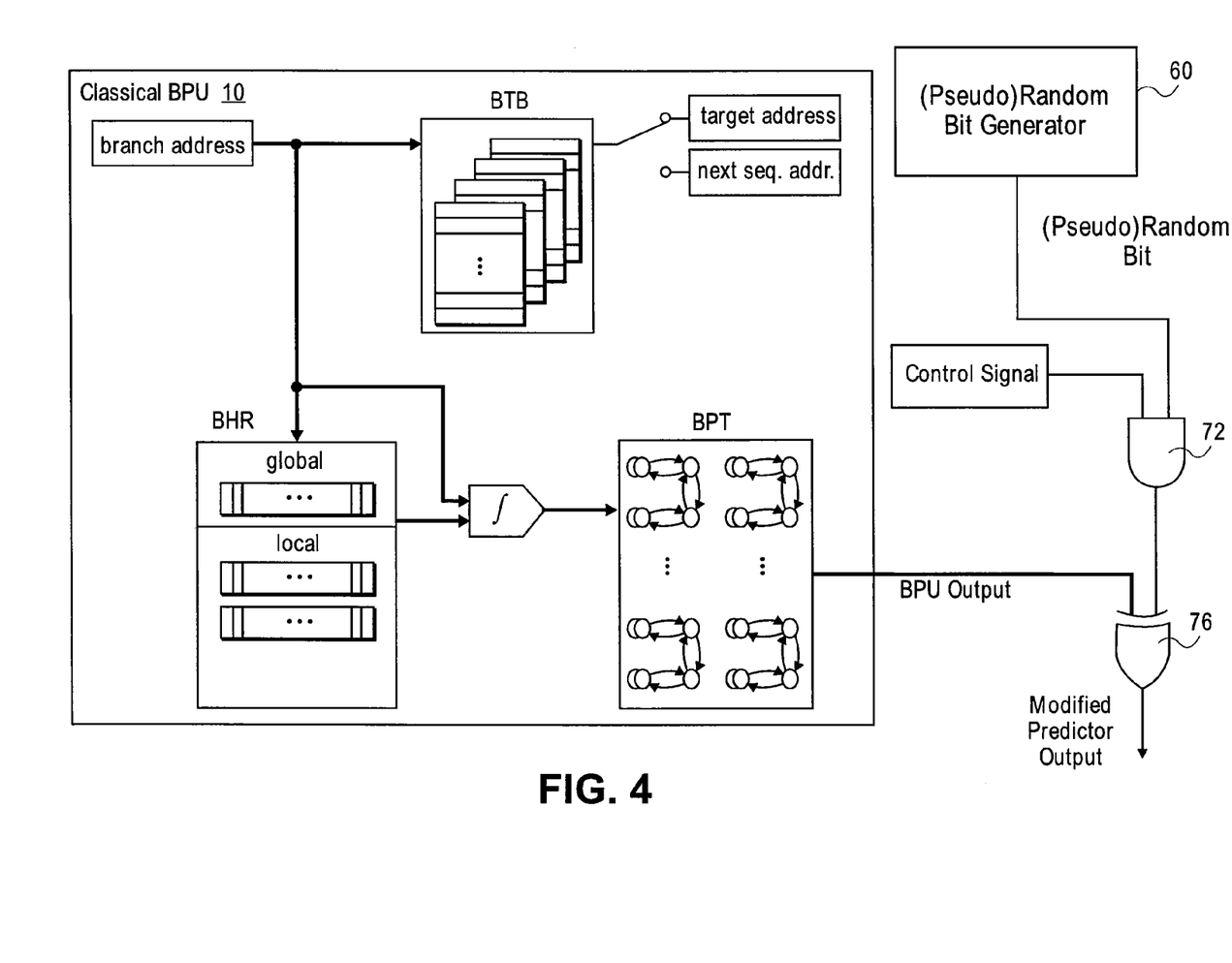
FIG. 4 illustrates logic circuits capable of inverting the classical prediction randomly according to an embodiment of the present invention.

This protection method may be implemented in a variety of ways. For example, in one embodiment, a protection method is implemented by selecting either the actual prediction or the fake prediction as illustrated in FIG. 3. As shown in FIG. 3, signal modification logic circuit 70 includes a circuit element 72 configured to produce the modified predictor output signal (fake prediction) by multiplexing (MUX) the BPU output signal and one or more bits of the signal generator. The signal generator may be configured to output a single (random) bit or multiple (random) bits. As another example, a protection scheme is implemented by inverting the classical prediction randomly, as shown in FIG. 4. As shown in FIG. 4, the signal modification logic circuit 70 includes circuit elements 74 and 76 configured to produce the modified predictor output signal by randomly inverting the BPU output signal. These diagrams are merely examples, which should not unduly limit the scope of the claims. One of ordinary skill in the art will recognize many variations, alternatives, and modifications. For example, a logic circuit 70 may be coupled to any signal path in any processor component or between any processor components, e.g., a wire internal to a cache or the BTB or the BPU or a buffer or a wire between the BHR and BPT, etc. In this case, the logic circuit receives a signal on the signal path and, responsive to a control signal, either outputs the received signal or a fake signal as described above. As another example, the fake output signal output by logic circuit 70 can include the control signal itself or the control signal inverted, or it can include the received output signal inverted.

BTB Related Countermeasures

The present invention also improves system security by reducing potential vulnerabilities related to the BTB. More specifically, in certain aspects, new secure branch instructions are introduced. In one aspect, to avoid the interference of malicious code, such as a spy/dummy process, to the execution of the cipher, the BTB records of each process are located in a different buffer. In another aspect, the BTB is implemented in such a way that the critical conditional branches always cause BTB hits or misses, in which case it is possible to implement a cipher so that the execution becomes independent of the BTB outcomes. In another aspect, the BTB records of critical conditional branches are located in an unpredictable manner so that the attacks become harder to apply, e.g., if the attacker does not know the exact location of a BTB record, the attacks will be more costly.

Independent BTB

According to one embodiment, a BPU is implemented with independent (i.e., unshared) branch target buffers. For example, in one aspect, each process in a CPU is allocated its own BTB space. Additionally or alternatively, each logical and/or physical processor unit is allocated its own BTB space. A physical processor may present itself to the OS as two or more independent logical processors. For example, in a Simultaneous Multi-Threading System (e.g., Intel's Hyper-Threading technology), a real physical processor is able to presents itself to the operating system as two or more independent logical processors. As a result of using independent, unshared buffer spaces, the interference between spy and cipher processes via BTB is minimized and/or prevented. An operating system (OS) is a set of computer programs that manage the hardware and software resources of a computer. An operating system processes raw system and user input and responds by allocating and managing tasks and internal system resources as a service to users and programs of the system. In general, all software that manages hardware and software resources of a computing environment will be referred to herein as the operating system. Examples of such software include virtual machine monitors, hypervisors, and reference monitors. While an adversary may clear the BTB during a context switch, the amount of biased BTB outcomes of the cipher is greatly reduced. The OS in the system may clear (e.g., flush, invalidate) a BTB space with a certain frequency and/or during special events. For example, the OS may clear the BTB during each context switch and/or before starting an execution of some applications and/or after the termination of some applications. Furthermore, the hardware system, e.g. a processor, or an application may also clear a BTB space with a certain frequency and/or during special events. A BTB space may include a portion of a BTB unit, an entire (separate) BTB unit, portions of separate BTB units, or a plurality of separate BTB units.

In one embodiment, the allocated BTB spaces are independent and are virtually and/or dynamically allocated. For example, in one aspect, BTBs may be implemented as separate physical units. In general, any number of separate physical BTB units may be implemented. Physical independence is implemented, in one aspect, (at least) by way of using a different physical BTB for each process and/or logical processor in the CPU. Also, each process and/or logical processor can be allocated more than one physical BTB. In another aspect, each process and/or logical processor can be allocated a separate buffer space that spans more than one physical BTB, e.g., multiple processes and/or logical processors share multiple BTBs, but the buffer space allocated to each process and/or logical processor is separate and unshared. According to another embodiment, a single large physical BTB is partitioned into multiple and preferably disjoint portions by way of hard coding (i.e., forcing each logical processor to use a disjoint portion of the BTB).

In another embodiment, the BTB are utilized as dynamically allocated virtual partitions. For example, a specific instruction set is provided for the process. In another embodiment, instructions are used to indicate the presence of sensitive operations and the need of (virtually) independent BTB.

Figure 5:
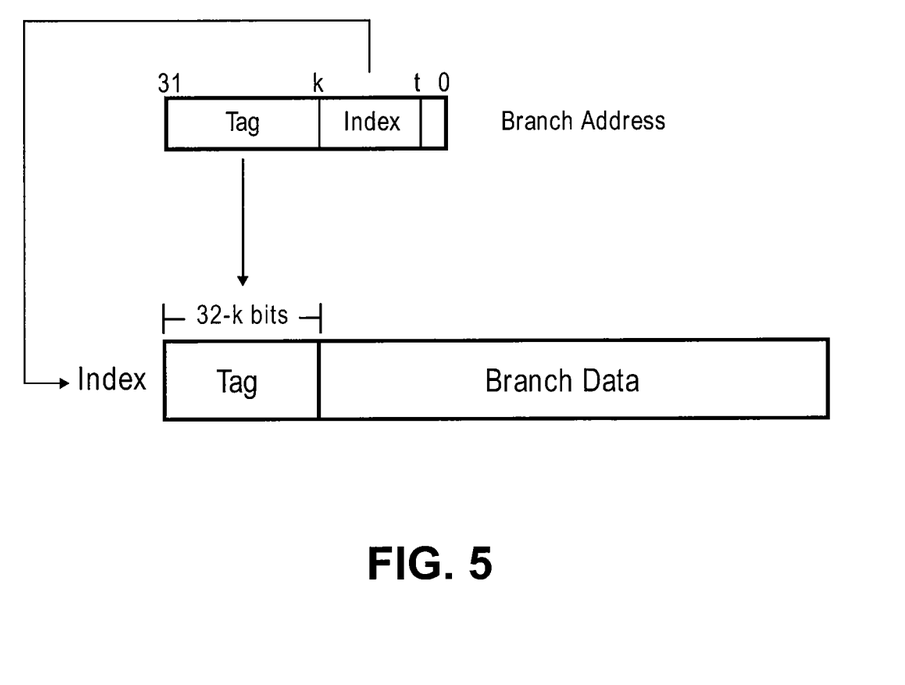
FIG. 5 illustrates a general BTB line.

FIG. 5 is a simplified diagram illustrating a conventional BTB line. As shown in FIG. 5, 32-bit addressing is used. The part of the branch address that spans from bit t to k−1 is used as an index to find the correct location of a branch in the BTB. The values of k and t typically depend on the system architecture. The "Tag" portion of the address is stored in the corresponding BTB line to compare it with the actual tag of an executed branch to determine whether the BTB has the correct entry.

Figure 6:
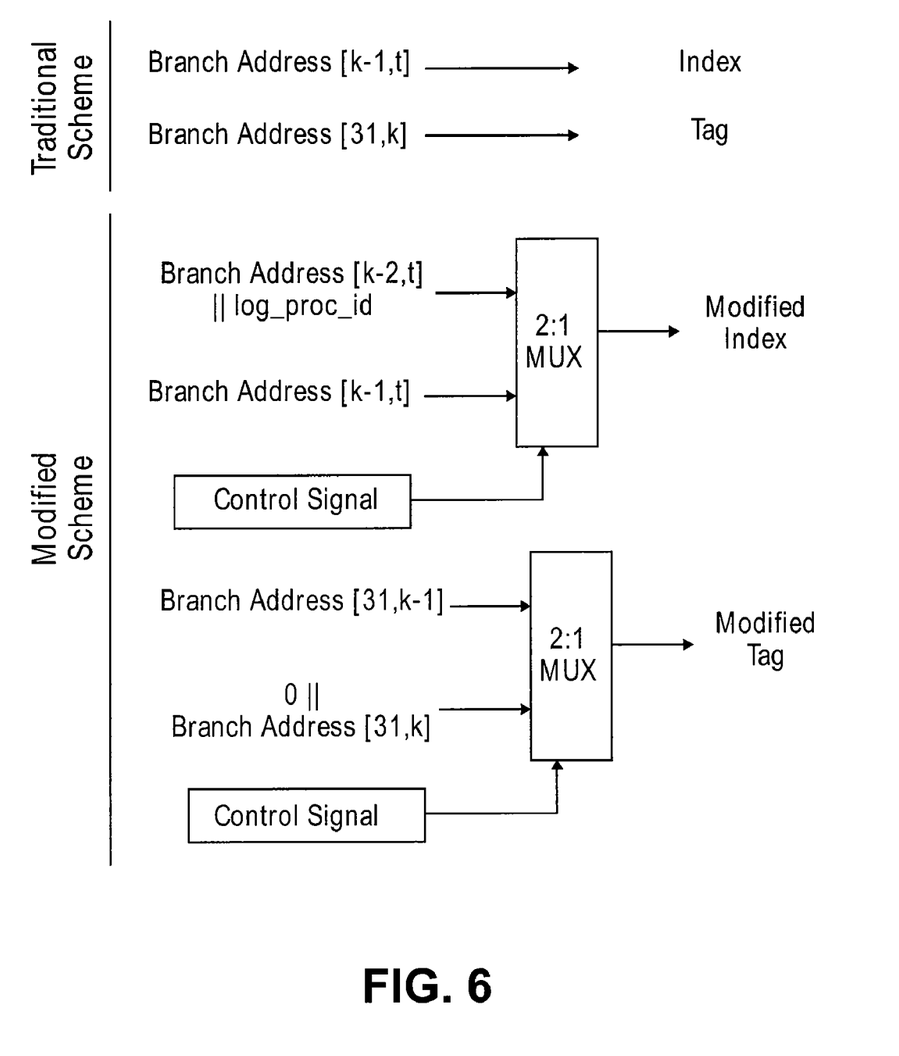
FIG. 6 illustrates a technique for virtually unsharing/partitioning the BTB according to an embodiment of the present invention.

In one aspect, to make each BTB independent, the BTB line is modified. For example, a modified BTB line according embodiments of the present invention allows for BTB lines to be virtually independent. FIG. 6 is a simplified diagram illustrating a modified BTB line according to an embodiment of the present invention. As shown, an identification number for a logical processor and/or process is implemented as part of the index (e.g., the most significant bit(s) of the index). As a result, each process and/or processor has virtually independent and unshared BTB partitions, as two different logical processors and/or processes cannot have two branches with the same index and the branch data from two different logical processors and/or processes have to be stored in different parts of the BTB.

To preserve the correct functionality, the tag address space in the BTB line is increased by a number of bits, N, where N is a number greater than or equal to zero. FIG. 6 is merely an example, which should not unduly limit the scope of the claims. One of ordinary skill in the art would recognize many variations, alternatives, and modifications.

In a specific embodiment, it is possible to dynamically switch between a normal BTB operation mode and a virtually unshared BTB mode using special instructions. For example, a process may indicate that it needs to be virtually independent (e.g. needs a virtually unshared BTB buffer) and/or the CPU can switch to the virtually unshared BTB mode. In one embodiment, during a context switch, the operating system stores this information (i.e. the need of be virtually independent) as part of the process state. For example, the operating system is able to set/reset the mode when determined to be necessary by the operating system.

Partitioned BTB

According to another embodiment, the present invention provides a partitioned BTB. Some parts of a BTB can be exclusively reserved and/or dedicated to some certain processes and/or logical processors. Depending upon the application, partitions can be dynamically allocated or statically implemented. In the case of dynamic partition allocation, new instructions are introduced to manage the dynamic partitioning. This management can be software based (i.e., the operating system can manage the partitions) and/or hardware based.

The software based partitioning can be implemented in different ways. By way of an example, the operating system (OS) can modify the logical addresses of the branches before starting the execution of a process. In order to do this, the OS has to have detailed information of the process' code, which can be provided by the compiler. Therefore, the OS can remove inter-process BTB collisions.

Another approach is to manage the partitioning in the hardware. Again this approach can be implemented in many different ways. The following are some examples.

In one embodiment, a process executes a special instruction that instructs the CPU to reserve a part of the BTB only to this process. For example, it may be necessary to use one of the reserved bits in control registers as a flag to indicate if the BTB has been partitioned. When the CPU receives the special instruction from a process, the CPU sets the flag and uses a special part of the BTB that is to be used only for this process's entries.

The special instruction is one way of various BTB protection methods. For example, in Pentium® 4, the BTB is 4-way associative. Accordingly, a CPU can reserve one or more specific ways of these 4 ways for a process and the entries of this process can exclusively use these parts of the BTB and the rest of the buffer can be used for general purposes, i.e., for other processes. For example, during a context switch, the new flag needs to be reset so that the partitioned way(s) can be used again for general purposes.

Depending on the application, the BTB may also be partitioned in many other ways. For example, the BTB can be partitioned in the same way a traditional cache is partitioned (with some minor modifications which are suitable for the BTBs as would be apparent to one skilled in the art). In this manner, a large part of the BTB does not need to be partitioned.

BTB-Set Lock

Figure 7:
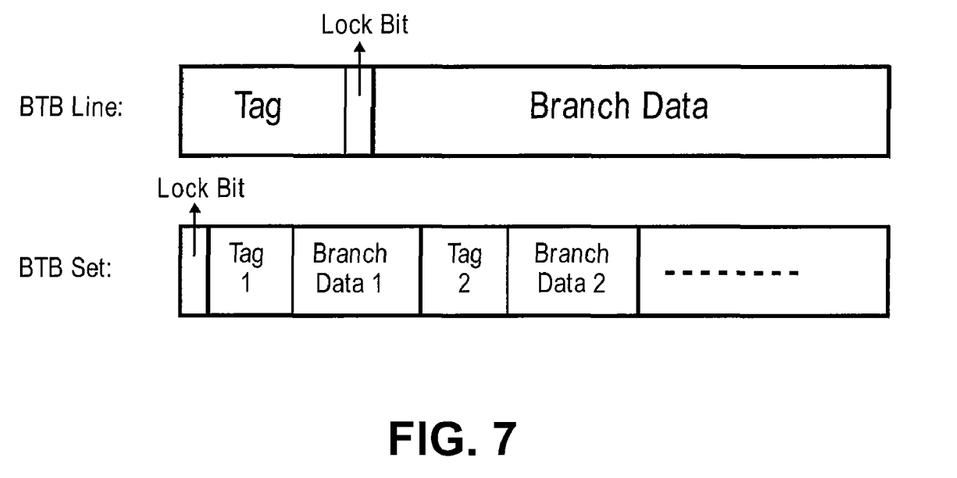
FIG. 7 illustrates a modified BTB line/set with a locking mechanism according to an embodiment of the present invention.

According to certain embodiments, rather than reserving a large portion of the BTB, one or more BTB entries (or sets) may be reserved for one or more entries of some processes. For example, reserving a smaller portion of the BTB advantageously allows for avoiding BP attacks without closing a large part of the BTB to general use. In one embodiment, as shown in FIG. 7, each entry (or set, respectively) includes an associated lock bit. The lock bit may be stored as part of the entry as shown in FIG. 7, or it may be stored in a different location in the computing system. When a process executes a special instruction (e.g., secure, conditional branch instruction), the CPU sets the lock bit of the particular entry (or set, respectively). Entries having their lock bit set are handled in a different, e.g., secure, manner than entries that do not have their lock bit set. For example, when the CPU loads a new value to the BTB, it may only evict the entries that do not have a lock bit set. Therefore, the target address of the target branch cannot be evicted from the BTB. In one aspect, at each context switch, all of the lock bits are reset.

In some cases, this technique may cause a race-condition and a possible deadlock. In an embodiment, a special part of BTB may be used to avoid deadlocks. For example, if a secure conditional branch faces a deadlock situation, an entry from this special part can be used to store the record of that branch.

A single or several BTB entries or a single/several BTB sets can be reserved in BTB for security critical branches. According to one embodiment, a BTB locking mechanism provides this capability. A process can determine which and how many of its branches needs to be handled in a more secure way. Some branches in a software can be marked as critical and the CPU would handle these branches differently than the others, e.g., in a more secure manner. Hardware additions to the BTB and a system interface for controlling which branches should be locked are provided. The system interface may be defined in several different ways including adding new instructions to the instruction set of the processor to specify which branches should be locked in BTB. The hardware additions to the BTB may also be implemented in several different ways. In one embodiment, a single bit is added to each BTB line. This bit specifies whether the entry stored in this BTB line is locked. In another embodiment, a single bit is added to each BTB set. In another embodiment, the CPU store this information in another part of the system, e.g., a buffer separate from the BTB. In general, the CPU stores the information of which entries in BTB should be locked. When an entry is locked in a BTB by a process, this entry should not be evicted as a result of execution of a branch that belongs to another process. In other words, a locked entry in the BTB should not be replaced by another entry that belongs to another process. A locked entry that belongs to a process can be removed from the BTB when this process terminates.

In one embodiment, as long as a process is active (i.e., not terminated), the locked entries that belong to this BTB cannot be evicted from BTB by a process different from the process that owns the entry and cannot be replaced by other processes' entries. The operating system or any other software that controls the overall system (referred to herein as the OS) may remove the locked entries from the BTB. For example, in one aspect, the OS removes the lock on the locked entries that belong to a process when this process terminates. In certain aspects, a lock on a BTB line can be removed by resetting the lock bit in this line.

The OS or the CPU needs to keep track of which locked BTB entries belong to which process. In one embodiment, additional hardware is added to each BTB line to store to which process this BTB entry belongs. In one aspect, this is done by storing an identification of the process, i.e., ID of the process. In another aspect, the CPU stores this information in another part of the system; for example in a dedicated buffer. In yet another aspect, this information is stored by the OS in buffer in main memory. In one embodiment, a new instruction is added to the instruction set. This new instruction can be executed by OS after the termination of a process to automatically remove the locking on the BTB entries that belong to this process. In one embodiment, the CPU needs to know the information on which processes are active and which processes are not active. This is done, in certain aspects, by a communication between the OS and CPU (for example via executing an instruction) and the OS can pass this information to CPU. In this aspect, the CPU can remove the locking on BTB entries that belong to a terminated process. In another aspect, the OS handles this task by removing the locking on BTB entries that belong to a terminated process. In one embodiment, a new instruction is added to the instruction set for removing the locking on a specified BTB entry (for example by resetting the lock bit). There can be several other alternatives. It should be realized that the techniques of locking a BTB entry is not limited to these specified entries and has a broader application range.

Constant BTB Output

According to one embodiment, an implementer-specified conditional branch, which can always yield a constant BTB output (e.g., either always a hit or a miss), is provided. One example of such a protected BTB area is described below.

Protected BTB Area

According to various embodiments, the target addresses of certain implementer-specified conditional branches may be stored in a protected BTB area in advance. For example, new pre-load instructions and secure conditional branch instructions may have to be preloaded.

Figure 8:
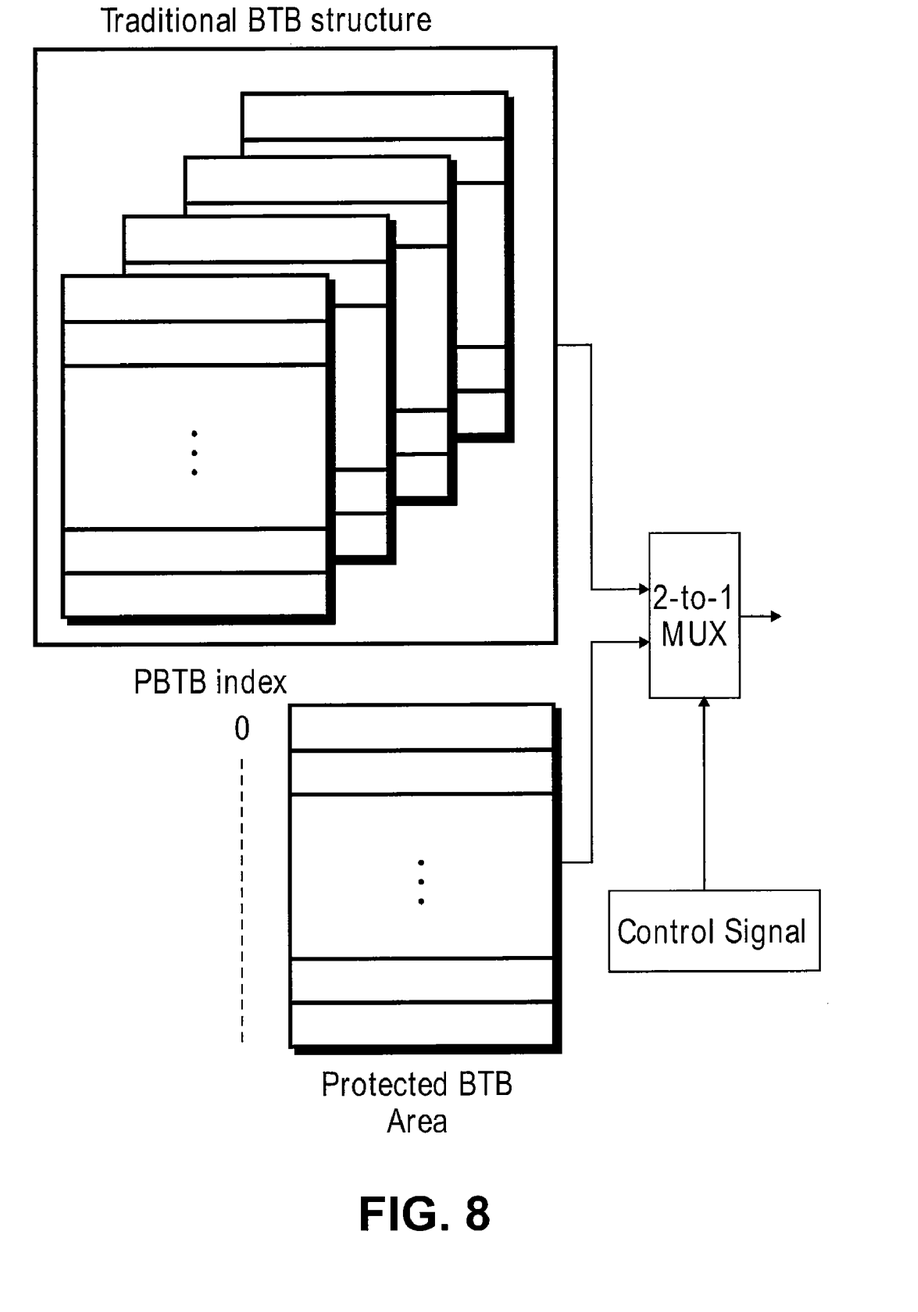
FIG. 8 illustrates a protected BTB area according to an embodiment of the present invention.

The target addresses can be loaded before the actual computations in a buffer and the new secure conditional branches can refer to the indices of this buffer. For example, as shown in FIG. 8, the instruction of a conditional branch can have the index instead of the actual target address. The CPU first fetches this particular location, then starts fetching instructions in the target address. This protected area is preferably unshared. During a context switch, the content needs to be saved and reloaded after the process starts again.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed:

1. A computing system, comprising:
   one or more devices, including:
   a processing unit that executes one or more processes; and
   a branch target buffer (BTB), wherein the BTB includes a plurality of entries, each entry having an associated lock bit, wherein a process executing on the processing unit determines whether to set a lock bit for a BTB entry, and wherein BTB entries having a set lock bit are handled differently than BTB entries that do not have a set lock bit.

2. The system of claim 1, wherein entries having a set lock bit cannot be evicted by a process other than the process that set the lock bit or an operating system.

3. The system of claim 1, wherein the operating system evicts entries having a lock bit set by a first process after the first process has terminated.

4. The system of claim 1, wherein the processing unit sets the lock bit for a particular entry in response to a cipher executing a secure conditional branch instruction.

5. The system of claim 1, wherein the associated lock bit is stored in a memory location different from the BTB.

6. The system of claim 1, wherein the associated lock bit is stored with the entry in the BTB.

* * * * *